(12) United States Patent
Cheng

(10) Patent No.: US 11,513,235 B2
(45) Date of Patent: Nov. 29, 2022

(54) GLOBAL NAVIGATION SATELLITE SYSTEM (GNSS) SIGNAL TRACKING

(71) Applicant: u-blox AG, Thalwil (CH)

(72) Inventor: Zhenlan Cheng, Thalwil (CH)

(73) Assignee: u-blox AG, Thalwil (CH)

( * ) Notice: Subject to any disclaimer, the term of this patent is extended or adjusted under 35 U.S.C. 154(b) by 848 days.

(21) Appl. No.: 16/319,699

(22) PCT Filed: Jul. 22, 2016

(86) PCT No.: PCT/EP2016/067598
§ 371 (c)(1),
(2) Date: Jan. 22, 2019

(87) PCT Pub. No.: WO2018/014980
PCT Pub. Date: Jan. 25, 2018

(65) Prior Publication Data
US 2021/0286088 A1 Sep. 16, 2021

(51) Int. Cl.
*G01S 19/29* (2010.01)
*G01S 19/52* (2010.01)

(52) U.S. Cl.
CPC .............. *G01S 19/29* (2013.01); *G01S 19/52* (2013.01)

(58) Field of Classification Search
CPC .......... G01S 19/29; G01S 19/37; G01S 19/52; H04B 1/70754; H04B 1/70758
See application file for complete search history.

(56) References Cited

U.S. PATENT DOCUMENTS 4,578,678 A 3/1986 Hurd
5,798,732 A * 8/1998 Eshenbach ............ G01S 19/235
342/357.62

(Continued)

FOREIGN PATENT DOCUMENTS

WO WO 2009/095087 A2 8/2009

OTHER PUBLICATIONS

M. Petovello et al., GNSS Solutions: What are vector tracking loops, and what are their benefits and drawbacks?, Inside GNSS, p. 16-21, May/Jun. 2009 (Year: 2009).*

(Continued)

*Primary Examiner* — Bernarr E Gregory
*Assistant Examiner* — Fred H Mull
(74) *Attorney, Agent, or Firm* — Finnegan, Henderson, Farabow, Garrett & Dunner, L.L.P.

(57) ABSTRACT

An apparatus for vector tracking a plurality of satellite signals received by a Global Navigation Satellite System (GNSS) receiver from a plurality of satellites and a method for use thereof. The apparatus comprises: a hypothesis determiner configured to determine a most likely velocity hypothesis from a plurality of velocity hypotheses based on a plurality of correlation values, and to transfer data related to the most likely velocity hypothesis to a navigation engine of the GNSS receiver for tracking the satellite signals, wherein the plurality of velocity hypotheses have been generated based on a navigation engine output indicative of a current and/or a previous extended velocity solution for the GNSS receiver; and wherein the plurality of correlation values have been determined by a plurality of correlators and represent correlations between a plurality of first signals each comprising an expected Doppler shift derived from one of the plurality of velocity hypotheses, and a plurality of (Continued)

second signals each comprising a true Doppler shift derived from one of the plurality of satellite signals.

20 Claims, 4 Drawing Sheets

(56) References Cited

U.S. PATENT DOCUMENTS

| | | | |
|---|---|---|---|
| 5,896,304 A * | 4/1999 | Tiemann | G01S 19/29 |
| | | | 375/E1.031 |
| 6,407,699 B1 * | 6/2002 | Yang | G01S 19/29 |
| | | | 342/357.65 |
| 10,018,474 B2 * | 7/2018 | Li | G01S 19/01 |
| 2004/0131032 A1 * | 7/2004 | Sendonaris | H04B 1/70754 |
| | | | 370/335 |
| 2006/0133463 A1 | 6/2006 | Pietila et al. | |
| 2013/0249735 A1 * | 9/2013 | Martin | G01S 19/29 |
| | | | 342/357.68 |
| 2014/0070987 A1 | 3/2014 | Jarvis et al. | |

OTHER PUBLICATIONS

International Search Report and Written Opinion dated Feb. 9, 2017, in International Application No. PCT/EP2016/067598 (12 pgs.).
Li Hui et al., "Frequency Tracking for High Dynamic GPS Signals Based on Vector Frequency Lock Loop", 2010 WASE International Conference on Information Engineering (ICIE), Piscataway, NJ, US, Aug. 14, 2010, pp. 98-101.

\* cited by examiner

GLOBAL NAVIGATION SATELLITE SYSTEM (GNSS) SIGNAL TRACKING

CLAIM FOR PRIORITY

This application is a U.S. national phase entry under 35 U.S.C. § 371 from PCT International Application No. PCT/EP2016/067598, filed Jul. 22, 2016, which this application claims priority and is incorporated herein by reference.

TECHNICAL FIELD

The invention relates to methods and apparatus for vector tracking of Global Navigation Satellite System (GNSS) signals received from a plurality of satellites. In particular arrangements, the invention relates to methods and apparatus for vector tracking GNSS signals based on velocity hypotheses for a GNSS receiver.

BACKGROUND

Many known GNSS receivers use code tracking loops to estimate pseudoranges to GNSS satellites and carrier tracking loops to estimate a carrier Doppler (or pseudorange rate) of signals received from the GNSS satellites. This method of satellite signal tracking may be termed scalar tracking.

A code tracking loop may, for example, be a delay lock loop (DLL) and a carrier tracking loop may, for example, be a frequency lock loop (FLL), a phase lock loop (PLL) or a combination of both, e.g. a FLL-assisted PLL. Such GNSS receivers include a code tracking loop and a carrier phase tracking loop per channel and each channel of the receiver processes signals from a specific GNSS satellite.

Broadly speaking, a DLL minimizes the timing difference between a signal received from a GNSS satellite and a locally generated version of the satellite signal. A DLL typically comprises two code correlators that correlates a received signal with a locally generated signal produced based on an output of a numerically controlled oscillator (NCO). The output of the code correlator is integrated over time to improve noise performance and the resulting signal is used in an algorithm to control the NCO to update the code phase of the next locally generated signal. In exemplary DLLs, there may be more than two code correlators, each producing one of early, prompt and late code correlations.

Broadly speaking, a FLL follows the same statistical signal processing technique. In one example, a carrier correlator correlates part of a received satellite signal (possibly at an intermediate frequency) with a corresponding locally generated carrier signal provided by a NCO. The output of the carrier correlator is integrated over time to improve noise performance and the resulting signal is used in an algorithm to control the NCO to update the locally generated carrier signal.

In practical implementations of GNSS receivers, the carrier tracking loop may be used to aid the code tracking loop. Further, the code and carrier tracking loops are typically in a nested arrangement whereby the carrier correlator is used to remove the carrier frequency and the resulting signal, which, in the case of perfect carrier tracking a DC signal, is passed to the code correlator.

Such GNSS receivers may implement separate signal tracking and navigation solutions in that the tracking loops operate in isolation to navigation solution determination. The code and carrier tracking loops provide the code and carrier measurements to a navigation engine, which uses those measurements to determine navigation solutions, typically position, velocity and time (i.e. receiver clock offset and drift) (PVT). Further, in scenarios where satellites from different GNSS constellations (for example, GPS, Galileo, GLONASS or BeiDou) are used to determine a navigation solution, satellite signals from each GNSS will also require separate tracking loops, which will be separately implemented and require separate elements and different configurations.

Vector tracking loops use a different architecture that combines signal tracking and navigation solution determination into a single loop. In exemplary vector tracking loops, pseudoranges and/or pseudorange rates are predicted, for example by a navigation engine, for each satellite signal to be tracked based on the navigation engine output, which may be a navigation solution (i.e. position, velocity and/or time). The predicted pseudoranges and pseudorange rates are fed into the tracking loop of each channel and are used to determine code estimates and carrier estimates that are fed to the navigation engine as in a standard GNSS receiver.

SUMMARY

According to the invention in an aspect, there is provided an apparatus for vector tracking a plurality of satellite signals received by a Global Navigation Satellite System (GNSS) receiver from a plurality of satellites. The apparatus comprises a hypothesis determiner configured to determine a most likely velocity hypothesis from a plurality of velocity hypotheses based on a plurality of correlation values, and to transfer data related to the most likely velocity hypothesis to a navigation engine of the GNSS receiver for tracking the satellite signals. The plurality of velocity hypotheses have been generated based on a navigation engine output indicative of a current and/or a previous extended velocity solution for the GNSS receiver. The plurality of correlation values have been determined by a plurality of correlators and represent correlations between a plurality of first signals each comprising an expected Doppler shift derived from one of the plurality of velocity hypotheses and a plurality of second signals each comprising a true Doppler shift derived from one of the plurality of satellite signals.

Optionally, the data related to the most likely velocity hypothesis comprises one or more of: the most likely velocity hypothesis; and a plurality of expected Doppler shifts based on the most likely velocity hypothesis, each of the plurality of expected Doppler shifts relating to one of the plurality of satellites.

The plurality of velocity hypotheses may have been generated based on a predicted change in one or more elements of the extended velocity solution.

The predicted change has optionally been determined based on one or more of: dynamics of the receiver, a variance of the navigation data, inertial sensor data and map data.

In exemplary arrangements, corresponding first and second signals each relate to one of the plurality of satellites, and wherein the correlation values represent correlations between the corresponding first and second signals.

Optionally, each of a plurality of sets of corresponding first and second signals relates to one of the velocity hypotheses. Each of the plurality of sets of corresponding first and second signals therefore comprises a plurality of first signals derived from one of the velocity hypotheses and relating to each of the plurality of satellites, and a corresponding plurality of second signals comprising the true Doppler shift and relating to each of the plurality of satellites. Each of the plurality of sets of corresponding first and second signals may include one or more common second signals.

Each of a plurality of sets of the correlation values may comprise a correlation value for each corresponding first and second signal in a set of corresponding first and second signals.

In some exemplary arrangements, a set of second signals may comprise a plurality of second signals each relating to a different one of the plurality of satellites, and a plurality of sets of first signals each comprise a plurality of first signals each relating to a different one of the plurality of satellites, wherein the plurality of first signals in a set of first signals have been derived from one of the plurality of hypotheses. In such exemplary arrangements, each of a plurality of sets of correlation values may comprise a correlation value for each of the second signals in the set of second signals and each of the first signals in a different set of first signals.

The hypothesis determiner may be configured to determine at least one sum of a plurality of correlation values in a set of correlation values, and to determine the most likely velocity hypothesis based on the at least one sum. In exemplary arrangements, the hypothesis determiner may be configured to determine at least two sums of a plurality of correlation values in different sets of correlation values.

In optional arrangements, the hypothesis determiner is configured to determine a plurality of the sums each relating to a different set of correlation values, and to determine the most likely velocity hypothesis to be the velocity hypothesis relating to a largest sum of the plurality of sums.

The hypothesis determiner may be configured to determine the most likely velocity hypothesis to be the velocity hypothesis relating to the largest sum in dependence on the largest sum being greater than a threshold value.

Optionally, one or more of the plurality of correlators may be configured to undertake a discrete Fourier transform, DFT, of a signal derived from one or more of late code correlation samples, prompt code correlation samples and early code correlation samples generated within the GNSS receiver, wherein the DFT spans a range of frequencies encompassing a frequency of the expected Doppler shift, and wherein a corresponding correlation value is indicative of a magnitude of an output of the DFT at the frequency of the expected Doppler shift.

Modulating data, such as a navigation message, may be removed from the signal derived from the one or more of the late code correlation samples, the prompt code correlation samples and the early code correlation samples by a modulating bit removal unit before the one or more of the plurality of correlators undertakes the DFT. The modulating bit removal unit may be a separate element of the apparatus for vector tracking or may form part of DFT block. The modulating bit removal unit may be a mixer or multiplier configured to receive modulating data and a signal comprising the modulating data and to produce an output comprising the signal with the modulating data removed, i.e. the signal without the modulating data. This may be achieved, for example, by multiplying the modulating data with the signal comprising the modulating data.

The apparatus may further comprises one or more code phase estimation units configured to receive a signal derived from late code correlation samples, prompt code correlation samples and/or early code correlation samples for one or more of the plurality of satellites, to determine one or more code phase estimates based on the signal derived from the late code correlation samples, prompt code correlation samples and early code correlation samples, and to transfer each code phase estimate to the navigation engine.

The first signals may comprise a transformation of each velocity hypothesis to line-of-sight vectors for each of the plurality of satellites.

Optionally, the apparatus further comprises one or more of: a velocity hypothesis unit for generating the plurality of velocity hypotheses and/or the first signals; the plurality of correlators; and the navigation engine.

The apparatus may comprise the navigation engine, wherein the navigation engine is configured to determine a subsequent extended velocity solution based at least in part on the data related to the most likely velocity hypothesis.

According to the invention in a further aspect, there is provided a GNSS receiver comprising an apparatus according to any set out above.

According to the invention in a further aspect, there is provided a method for vector tracking a plurality of satellite signals received by a Global Navigation Satellite System (GNSS) receiver from a plurality of satellites. The method comprises determining, by a hypothesis determiner, a most likely velocity hypothesis from a plurality of velocity hypotheses based on a plurality of correlation values. The method further comprises transferring, by the hypothesis determiner, data related to the most likely velocity hypothesis to a navigation engine of the GNSS receiver for tracking the satellite signals. The plurality of velocity hypotheses have been generated based on a navigation engine output indicative of a current and/or a previous extended velocity solution for the GNSS receiver. The plurality of correlation values have been determined by a plurality of correlators and represent correlations between a plurality of first signals each comprising an expected Doppler shift derived from one of the plurality of velocity hypotheses and a plurality of second signals each comprising a true Doppler shift derived from one of the plurality of satellite signals.

The data related to the most likely velocity hypothesis may comprise one or more of: the most likely velocity hypothesis; and a plurality of expected Doppler shifts based on the most likely velocity hypothesis, each of the plurality of expected Doppler shifts relating to one of the plurality of satellites.

Optionally, the method further comprises a velocity hypothesis unit generating the plurality of velocity hypotheses.

The plurality of velocity hypotheses may be generated based on a predicted change in one or more elements of the extended velocity solution.

The method may further comprises the velocity hypothesis unit determining the predicted change based on one or more of: dynamics of the receiver, a variance of the navigation data, inertial sensor data and map data.

In exemplary arrangements, corresponding first and second signals each relate to one of the plurality of satellites, and wherein the correlation values represent correlations between the corresponding first and second signals.

Each of a plurality of sets of corresponding first and second signals may relate to one of the velocity hypotheses.

Optionally, each of a plurality of sets of the correlation values comprises a correlation value for each corresponding first and second signal in a set of corresponding first and second signals.

The method may further comprise: the hypothesis determiner determining at least one sum of a plurality of correlation values in a set of correlation values; and the hypothesis determiner determining the most likely velocity hypothesis based on the at least one sum.

The method may further comprise: the hypothesis determiner determining a plurality of the sums each relating to a different set of correlation values; and the hypothesis determiner determining the most likely velocity hypothesis to be the velocity hypothesis relating to a largest sum of the plurality of sums.

Optionally, the method further comprises: the hypothesis determiner determining the most likely velocity hypothesis to be the velocity hypothesis relating to the largest sum in dependence on the largest sum being greater than a threshold value.

Exemplary methods may further comprise the plurality of correlators determining the plurality of correlation values.

One or more of the plurality of correlators may undertake a discrete Fourier transform, DFT, of a signal derived from one or more of late code correlation samples, prompt code correlation samples and early code correlation samples generated within the GNSS receiver, wherein the DFT spans a range of frequencies encompassing a frequency of the expected Doppler shift, and wherein a corresponding correlation value is indicative of a magnitude of an output of the DFT at the frequency of the expected Doppler shift.

The method may further comprise removing, by a modulating bit removal unit, a navigation message from the signal derived from the one or more of the late code correlation samples, the prompt code correlation samples and the early code correlation samples before the one or more of the plurality of correlators undertakes the DFT.

Exemplary methods further comprise: one or more code phase estimation units receiving a signal derived from late code correlation samples, prompt code correlation samples and/or early code correlation samples for one or more of the plurality of satellites; the one or more code phase estimation units determining one or more code phase estimates based on the signal derived from the late code correlation samples, prompt code correlation samples and early code correlation samples; and the one or more code phase estimation units transferring each code phase estimate to the navigation engine.

Optionally, the method further comprises a velocity hypothesis unit deriving the first signals comprising a transformation of each velocity hypothesis to line-of-sight vectors for each of the plurality of satellites.

The method may further comprise the navigation engine determining a subsequent extended velocity solution based at least in part on the data related to the most likely velocity hypothesis.

According to the invention in a further aspect, there is provided a computer program comprising instructions which, when executed on at least one processor, cause the at least one processor to carry out any one of the methods mentioned herein.

According to the invention in a further aspect, there is provided a carrier containing the computer program mentioned above, wherein the carrier is one of an electronic signal, optical signal, radio signal, or non-transitory computer readable storage medium.

BRIEF DESCRIPTION OF THE DRAWINGS

Exemplary embodiments of the invention are described herein with reference to the accompanying drawings, in which.

DETAILED DESCRIPTION

Figure 1:
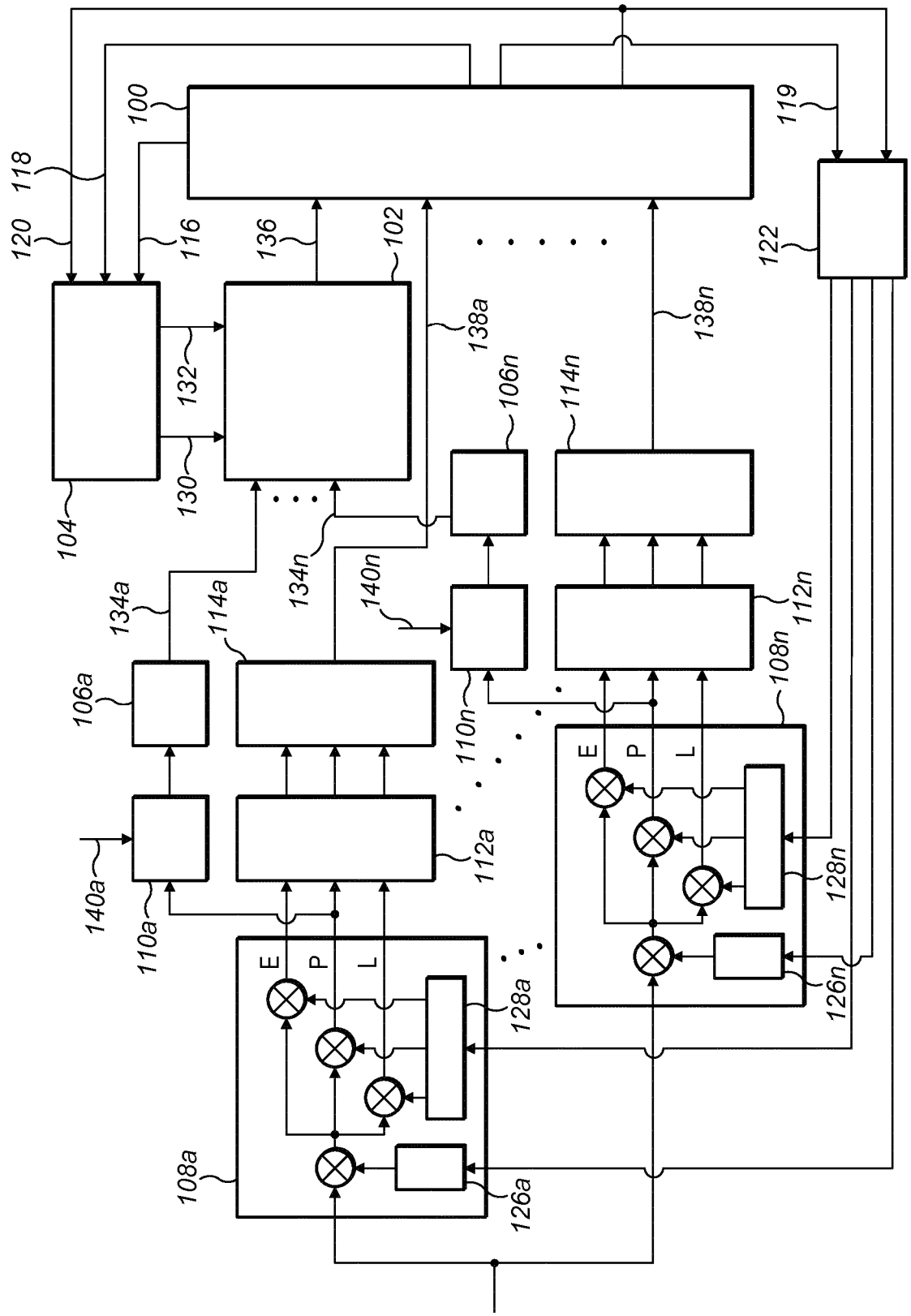
FIG. 1 is a block schematic diagram of an apparatus for vector tracking of a plurality of satellite signals received at a GNSS receiver.

Generally, disclosed herein are methods and apparatus for extended velocity vector tracking of a GNSS receiver using satellite signals received from a plurality of GNSS satellites. In this context, the extended velocity vector comprises the 3-D velocity and the local clock drift of the receiver. Exemplary methods and apparatus are arranged to track the velocity of the receiver directly and to track the satellite signals indirectly, partly in the velocity domain and partly in the tracking parameter domain. That is, the satellite signals are tracked based on a plurality of velocity hypotheses and a plurality of measurement hypotheses that are in the tracking parameter domain.

The velocity hypotheses and the measurement hypotheses are based on a navigation engine output from a current and/or a previous epoch. The navigation engine output used to determine the velocity hypotheses may be an extended velocity solution or an updated extended velocity solution, $v=[x'\ y'\ z'\ \delta^1]^T$, and the navigation engine output used to determine the measurement hypotheses may be a full PVT solution or an updated full PVT solution. The updated extended velocity solution and the updated full PVT solution may be determined based on a transition matrix of a system dynamic equation, such as a Kalman filter, implemented by the navigation engine. This is explained in greater detail below.

The velocity hypotheses may comprise hypothesized (or predicted) velocity domain data based on the navigation engine output. The velocity hypotheses may be an extended velocity hypothesis comprising an extended velocity vector. For the remainder of this document the terms "velocity hypothesis" and "velocity solution" are used, but it should be understood that these terms encompasses the extended velocity hypothesis and extended velocity solution respectively.

The most likely velocity hypothesis is determined and used to track the GNSS satellite signals. This may be done by updating a navigation solution for a GNSS receiver, which can then be used to control, for example, a carrier numerically controlled oscillator (NCO) as explained below.

Exemplary methods and apparatus use the velocity hypotheses to replace a tracking parameter hypothesis that may be used during satellite signal re-acquisition and satellite signal tracking using standard carrier tracking loops. Unlike traditional multi-GNSS receivers where each tracking channel measures a pseudorange estimate and a Doppler estimate for a particular satellite in order to track satellite signals and calculate a PVT solution, exemplary methods and apparatus may use velocity hypotheses directly along with psuedorange or code phase estimates to track GNSS satellites.

The velocity hypotheses may be mapped to the tracking parameter domain in order to drive correlators, as explained in more detail below. This way the velocity hypotheses may be evaluated in both satellite signal re-acquisition and satellite signal tracking. Therefore, signal power from all visible satellites, which may be part of different GNSS systems, can be combined coherently or non-coherently for signal to noise ratio (SNR) improvement in extremely low Carrier-to-Noise power density ratio ($C/N_0$) environments.

The advantages of exemplary methods and apparatus disclose herein include:

- With an increasing number of satellite signals received, the overall signal power and therefore the SNR of the GNSS receiver increases linearly, which improves signal tracking sensitivity;
- Integration of received satellite signals over time is interchangeable with integration of received satellite signals over satellites, i.e., in order to reach similar levels of SNR performance to scalar tracking algorithms, the methods and apparatus disclosed herein require shorter integration time, which allows for higher tracking loop dynamics;
- As the signal model only consists of line-of-sight (LOS) signals, an improved multipath and interference rejection is possible;
- An at least partial combination of satellite signal tracking and navigation solution determination;
- A reduction in the number of tracking loops required in a GNSS receiver; and
- A platform for combining satellite signals received from multiple GNSSs in a single GNSS receiver.

FIG. 1 shows a block schematic diagram of an exemplary apparatus for tracking GNSS satellite signals. The apparatus comprises a navigation engine 100 configured to determine a navigation solution comprising one or more elements of a PVT vector for a given GNSS receiver.

The apparatus also comprises a hypothesis determiner 102 configured to determine a most likely velocity hypothesis from a plurality of velocity hypotheses. In the exemplary arrangement of FIG. 1, the velocity hypotheses are extended velocity hypotheses, which include a clock drift hypothesis. The hypothesis determiner 102 is further configured to transfer to the navigation engine 100 data relating to the most likely velocity hypothesis. Such data may comprise the most likely velocity hypothesis and/or Doppler shift data for each satellite signal, as explained in detail below.

The apparatus also comprises a velocity hypothesis unit 104 for generating the plurality of velocity hypotheses. The plurality of velocity hypotheses are generated based on a navigation engine output from a most recent, or current, epoch. In exemplary arrangements, the navigation engine output from the current epoch may comprise the most recent velocity solution and the most recent clock drift solution. In the exemplary arrangement of FIG. 1, the navigation engine output from the current epoch comprises the predicted velocity and clock drift determined by the navigation engine 100. For the remainder of this document, the term "velocity prediction" encompasses a vector including the predicted velocity in the x-, y- and z-axis directions and the predicted clock drift. The velocity prediction comprises the current velocity solution and clock drift solution multiplied by a transition matrix of a system dynamic equation (e.g matrix "A" in the Kalman filter dynamic equation). In exemplary methods and apparatus, the velocity hypotheses may be generated by the addition of a delta in velocity to the navigation engine output, which in the case of FIG. 1 is the velocity prediction.

The apparatus also comprises a plurality of correlators, which in the exemplary apparatus of FIG. 1 are provided by Discrete Fourier Transform (DFT) units 106a-106n. The process of correlation using the DFT units 106a-106n is explained in detail below. The correlation using the DFT units 106a-106n may be undertaken on one or more of early code correlation samples, prompt code correlation samples and late code correlation samples generated by a plurality of baseband processing units 108a-108n. In the exemplary apparatus of FIG. 1, the prompt code correlation samples are used. Specifically, the prompt code correlation samples from each channel are received by modulating bit removal units 110a-110n before being passed to the plurality of DFT units 106a-106n for long correlation.

The apparatus also comprises a plurality of integrate-and-dump units 112a-112n that receive the early code correlation samples, prompt code correlation samples and late code correlation samples and integrate them over time to average out the noise before passing the integrated early code correlation samples, prompt code correlation samples and late code correlation samples to a plurality of code phase estimation units 114a-114n that are configured to estimate the code phase based on the position and clock offset prediction and pass the code phase estimates to the navigation engine 100.

In exemplary apparatus, each channel of a GNSS receiver comprises a baseband processing unit 108a-108n, an integrate-and-dump unit 112a-112n, a code phase estimation unit 114a-114n, a modulating bit removal unit 110a-110n and a DFT unit 106a-106n.

The navigation engine 100 is configured to transfer to the velocity hypothesis unit 104 variance data 116 indicating an estimated accuracy of the navigation solution and therefore the velocity prediction. The navigation engine is also configured to transfer the navigation engine output (including the velocity prediction) 118 and LOS data 120, which comprises a LOS vector pointing from the receiver antenna to the satellite antenna position. Both satellite velocity and the receiver velocity are projected to the LOS vector in order to calculate the expected observed Doppler frequency. The navigation engine output 118 received at the velocity hypothesis unit 104 may be used to derive the velocity hypotheses, as described below.

It is noted that, in exemplary methods and apparatus, the transferring of data encompasses the generation of electrical signals by one entity and the reception of those electrical signals by another entity. The transference may comprise a transmission. The transmission may be over a wired connection and may be undertaken within a processor.

The navigation engine 100 is also configured to transfer a further navigation engine output 119 and the LOS data 120 for each satellite to a central parameter generator (CPG) 122. The further navigation engine output 119 may comprise a navigation solution prediction, which e.g. may be calculated by multiplying the current navigation solution by a transition matrix of a system dynamic equation (e.g. the matrix "A" of the Kalman filter dynamic equation) running in the navigation engine 100. The CPG 122 maps the further navigation engine output to the LOS vector for each satellite and determines a predicted carrier frequency and code phase for each satellite. The CPG 122 transfers the predicted carrier frequencies to carrier generators 126a-126n in the baseband processing units 108a-108n and transfers the predicted code phases to code generators 128a-128n in the baseband processing units 108a-108n. The carrier generators 126a-126n and the code generators 128a-128n are configured to generate the replicas of the carrier for carrier wipe-off and code with corresponding carrier frequency, code phase and chipping rate for production of the multiple of early code correlation samples, prompt code correlation samples and late code correlation samples.

A number of signals and equations that may be used in exemplary methods and apparatus are defined below.

Firstly, a signal that is received at an antenna of a GNSS receiver may be modelled as a sum of a plurality of satellite signals corrupted by additive noise. This received complex baseband signal can be written as:

$$r(t)=g(t)+n(t) \quad (1)$$

Where $$g(t)=\Sigma_{k=0}^{K-1}g_k(t) \quad (2)$$

And $$g_k(t)=h_k e^{j(\omega_k+\Omega)t}s_k(t-\tau_k-T) \quad (3)$$

Where

K is the number of satellites $g_k(t)$ is the noise-free received signal component from satellite k $g(t)$ is the noise-free received signal $n(t)$ is the additive white Gaussian noise $s_k(t)$ is the base-band transmitted signal from satellite k with corresponding pseudo-random noise (PRN) code and individual modulating bits $[h_k, \omega_k, \tau_k, a\ T]^T \equiv \theta_k$ is a vector consisting of the following tracking relevant parameters, and $[\ \ldots\ ]^T$ denotes the matrix transpose $h_k$ is the complex amplitude of satellite k $\omega_k$ is the Doppler frequency of satellite k $\tau_k$ is the propagation delay of satellite k T is an apparent common delay introduced by the local clock offset, which is satellite independent $\Omega$ is an apparent common frequency introduced by the local clock drift, which is satellite independent In the above, only the LOS component of the received signal is considered and multipath effects are neglected. Further, minor atmospheric effects are also neglected.

The navigation state of the GNSS receiver in which the apparatus is located can be described by a time variant position, velocity and time (PVT) vector. Any part of the PVT vector is considered to be navigation data herein.

$$p=[x\ y\ z\delta\ x'\ y'\ z'\ \delta']^T$$

Where x, y, z denotes a time varying three-dimensional position of the GNSS receiver x', y', z' denotes a time varying three-dimensional velocity of the GNSS receiver $\delta, \delta'$ denotes a local clock offset and a local clock drift of the GNSS receiver $(\ \ldots\ )'$ denotes a first derivative For a given p and a given satellite constellation with known ephemeris, a LOS vector, $\vec{u}_k$, pointing from the receiver antenna to the antenna position of satellite k can be derived. A standard mapping function, $\theta_k=f(p, \vec{u}_k)$ can be determined that transforms p into $\theta$ (defined above) except for the complex amplitudes $h_k$ within $\theta$. The complex amplitudes cannot be determined mainly because the Channel State Information (CSI) for the transmission of the satellite signals from the satellites to the GNSS receiver, in particular the phase information, is unknown, although the ionosphere distortion is known to some extent and is broadcast by the satellites.

Both coherent and non-coherent estimation schemes for the extended velocity vector $v=[x'\ y'\ z'\ \delta']^T$ can be formulated as follows, where a central PVT vector, $\hat{p}^{(0)}$, serves as a basis in each estimation iteration. It is assumed that $h_k$ is known from a previous tracking epoch or from classical techniques for satellite signal acquisition as explained below.

As discussed above, the remaining tracking parameters in the vector $\theta$ defined above as part of the signal model are mutually constrained through p and may be determined from the mapping function $f(p, \vec{u}_k)$. The maximum likelihood (ML) estimation of p or any subset of p does not require the complete intermediate estimates of $\theta$, as is typically done in scalar tracking architectures, such as those discussed in the background section. Instead, a log-likelihood function can be maximized directly with respect to v as follows, which is referred to as PVT domain tracking, joint parameter estimation or vector tracking.

$$\hat{v}\approx\arg\max_{v^{(i)}}\Sigma_k\ \Re\ \{\int_{-\infty}^{\infty}r(t)g^*_k(t;\ v_k^{(i)}|\theta_k^{(0)})dt\} \quad (4)$$

Where $\hat{v}$ denotes an estimate of v $v_k^{(i)}$ denotes $v^{(i)}$ projected to $\vec{u}_k$ $\Re$ denotes the real part $(\ \ldots\ )^*$ denotes the complex conjugate $\theta_k^{(0)}$ the vector $\theta$ corresponding to the further navigation engine output 119 transformed to the tracking parameter domain using the LOS vector associated with satellite k Here we neglect the cross-correlation between the satellites, which is reasonable for the PRN code properties in GNSS, and $v^{(i)}$ denotes the i-th extended velocity hypothesis.

In practice, $h_k$ should be estimated, which is only possible for relatively strong signals. For weak signals equation (4) may be further developed to remove the dependency on $h_k$. To that end, a non-coherent estimation of v may be derived, as set out below.

$$\hat{v}=\arg\max_{v^{(i)}}\Sigma_k|\int_{-\infty}^{\infty}r(t)g^*_k(t;\ v_k^{(i)}|\theta_k^{(0)})dt|^n \quad (5)$$

Where n is typically either 1 or 2. The above present two estimations of v: a coherent estimation in equation (4), which is suitable for use with phase locked loop (PLL) applications and/or in moderate/high $C/N_0$ environments; and a non-coherent estimate in equation (5), which is suitable for use with frequency lock loop (FLL) applications and/or with relatively weak received satellite signals when it comes to carrier tracking. In the remainder of this document only the non-coherent estimation is discussed.

The navigation engine 100 may use a Kalman filter to generate a navigation solution. Upon defining the observation to be a mixture of the extended velocity vector v together with the traditional code phase of all satellites as well as the local clock offset to be a new observation vector, a model for the Kalman filter may be formulated based on the following dynamic equation (6) and a velocity relevant observation equation.

$$p[n+1]=Ap[n]+z[n] \quad (6)$$

In equation (6), A is the transition matrix, and z[n] is the process noise.

An exemplary method for tracking GNSS signals will now be described with reference to FIG. 2 and the signals and equations given above.

The navigation engine 100 transfers 200 the navigation engine output (in this case the velocity prediction) 118, to the velocity hypothesis unit 104 and the further navigation engine output (in the case a navigation prediction) 119 to the CPG 122. The navigation engine output 118 and the further navigation engine output 119 are based on a navigation solution for the current epoch. The navigation solution may be arrived at by a dynamic model, such as a Kalman filter, running in the navigation engine 100 during a previous iteration of the methods disclosed herein. Alternatively, the navigation solution may be arrived at by a first fix of the GNSS receiver using classical techniques for satellite signal acquisition followed by a least squares estimation of the navigation solution. In the exemplary methods and apparatus disclosed, the navigation engine 100 also transfers the LOS data 120 to the velocity hypothesis unit 104 and the CPG 122.

At step 202, the CPG 122 generates a mapping function $\theta_k = f(p, \vec{u}_k)$, maps the further navigation engine output 119 using the LOS data 120 for the satellites and determines a predicted carrier frequency and code phase for each satellite. The CPG 122 transfers the predicted carrier frequencies to carrier generators 126a-126n and transfers the predicted code phases to code generators 128a-128n in the baseband processing units 108a-108n.

The velocity hypothesis unit 104 generates 204 a plurality of velocity hypotheses based on at least the received velocity prediction 118. The velocity hypothesis unit 104 uses the velocity prediction 118, which is from the current navigation epoch, to generate the plurality of velocity hypotheses. The velocity hypothesis unit 104 may generate at least some of the plurality of velocity hypotheses by adding and/or subtracting a predicted velocity change and a predicted clock drift change to at least the values of the velocity prediction (i.e. the predicted velocity along the x-, y- and z-axis and the predicted clock drift) 118. The predicted change may be determined based on one or more constraints, such as the variance data 116, which may also be transferred to the velocity hypothesis unit 104 by the navigation engine 100, data received from an inertial navigation system and any constraints provided by the physical environment, which may be determined based on geographic map data or other external information sources.

In exemplary methods and apparatus, the velocity hypothesis unit 104 may determine a central hypothesis $v^{(0)}[n]$, which is the velocity prediction 118, from the previous navigation epoch and one or more of the constraints discussed above. The velocity hypothesis unit 104 may then determine the remainder of the plurality of velocity hypotheses $v^{(i)}[n] \forall i > 0$ by determining one or more delta values based on one or more of the constraints mentioned above and adding and/or subtracting the delta values to/from the central hypothesis. The remainder of the plurality of velocity hypotheses each comprise hypothesised $[x'\ y'\ z']^T$.

Therefore, an exemplary plurality of velocity hypotheses may be represented as $v^{(i)}[n]$, $i \geq 0$ and in a specific example may comprise the following.

| Velocity hypothesis | Hypothesised values | | | |
|---|---|---|---|---|
| $v^{(0)}[n]$ | $x^{(0)\prime}$ | $y^{(0)\prime}$ | $z^{(0)\prime}$ | $\delta^{(0)\prime}$ |
| $v^{(1)}[n]$ | $x^{(0)\prime} + \Delta_x$ | $y^{(0)\prime}$ | $z^{(0)\prime}$ | $\delta^{(0)\prime}$ |
| $v^{(2)}[n]$ | $x^{(0)\prime}$ | $y^{(0)\prime} + \Delta_y$ | $z^{(0)\prime}$ | $\delta^{(0)\prime}$ |
| $v^{(3)}[n]$ | $x^{(0)\prime} + \Delta_x$ | $y^{(0)\prime} + \Delta_y$ | $z^{(0)\prime}$ | $\delta^{(0)\prime}$ |
| $v^{(4)}[n]$ | $x^{(0)\prime}$ | $y^{(0)\prime}$ | $z^{(0)\prime} + \Delta_z$ | $\delta^{(0)\prime}$ |
| $v^{(5)}[n]$ | $x^{(0)\prime} + \Delta_x$ | $y^{(0)\prime}$ | $z^{(0)\prime} + \Delta_z$ | $\delta^{(0)\prime}$ |
| $v^{(6)}[n]$ | $x^{(0)\prime}$ | $y^{(0)\prime} + \Delta_y$ | $z^{(0)\prime} + \Delta_z$ | $\delta^{(0)\prime}$ |
| $v^{(7)}[n]$ | $x^{(0)\prime} + \Delta_x$ | $y^{(0)\prime} + \Delta_y$ | $z^{(0)\prime} + \Delta_z$ | $\delta^{(0)\prime}$ |
| $v^{(8)}[n]$ | $x^{(0)\prime}$ | $y^{(0)\prime}$ | $z^{(0)\prime}$ | $\delta^{(0)\prime} + \Delta\delta'$ |
| $v^{(9)}[n]$ | $x^{(0)\prime} + \Delta_x$ | $y^{(0)\prime}$ | $z^{(0)\prime}$ | $\delta^{(0)\prime} + \Delta\delta'$ |
| $v^{(10)}[n]$ | $x^{(0)\prime}$ | $y^{(0)\prime} + \Delta_y$ | $z^{(0)\prime}$ | $\delta^{(0)\prime} + \Delta\delta'$ |
| $v^{(11)}[n]$ | $x^{(0)\prime} + \Delta_x$ | $y^{(0)\prime} + \Delta_y$ | $z^{(0)\prime}$ | $\delta^{(0)\prime} + \Delta\delta'$ |
| $v^{(12)}[n]$ | $x^{(0)\prime}$ | $y^{(0)\prime}$ | $z^{(0)\prime} + \Delta_z$ | $\delta^{(0)\prime} + \Delta\delta'$ |
| $v^{(13)}[n]$ | $x^{(0)\prime} + \Delta_x$ | $y^{(0)\prime}$ | $z^{(0)\prime} + \Delta_z$ | $\delta^{(0)\prime} + \Delta\delta'$ |
| $v^{(14)}[n]$ | $x^{(0)\prime}$ | $y^{(0)\prime} + \Delta_y$ | $z^{(0)\prime} + \Delta_z$ | $\delta^{(0)\prime} + \Delta\delta'$ |
| $v^{(15)}[n]$ | $x^{(0)\prime} + \Delta_x$ | $y^{(0)\prime} + \Delta_y$ | $z^{(0)\prime} + \Delta_z$ | $\delta^{(0)\prime} + \Delta\delta'$ |
| $v^{(16)}[n]$ | $x^{(0)\prime} - \Delta_x$ | $y^{(0)\prime}$ | $z^{(0)\prime}$ | $\delta^{(0)\prime}$ |
| $v^{(17)}[n]$ | $x^{(0)\prime}$ | $y^{(0)\prime} - \Delta_y$ | $z^{(0)\prime}$ | $\delta^{(0)\prime}$ |
| $v^{(18)}[n]$ | $x^{(0)\prime} - \Delta_x$ | $y^{(0)\prime} - \Delta_y$ | $z^{(0)\prime}$ | $\delta^{(0)\prime}$ |
| $v^{(19)}[n]$ | $x^{(0)\prime}$ | $y^{(0)\prime}$ | $z^{(0)\prime} - \Delta_z$ | $\delta^{(0)\prime}$ |
| $v^{(20)}[n]$ | $x^{(0)\prime} - \Delta_x$ | $y^{(0)\prime}$ | $z^{(0)\prime} - \Delta_z$ | $\delta^{(0)\prime}$ |
| $v^{(21)}[n]$ | $x^{(0)\prime}$ | $y^{(0)\prime} - \Delta_y$ | $z^{(0)\prime} - \Delta_z$ | $\delta^{(0)\prime}$ |
| $v^{(22)}[n]$ | $x^{(0)\prime} - \Delta_x$ | $y^{(0)\prime} - \Delta_y$ | $z^{(0)\prime} - \Delta_z$ | $\delta^{(0)\prime}$ |
| $v^{(23)}[n]$ | $x^{(0)\prime}$ | $y^{(0)\prime}$ | $z^{(0)\prime}$ | $\delta^{(0)\prime} - \Delta\delta'$ |
| $v^{(24)}[n]$ | $x^{(0)\prime} - \Delta_x$ | $y^{(0)\prime}$ | $z^{(0)\prime}$ | $\delta^{(0)\prime} - \Delta\delta'$ |
| $v^{(25)}[n]$ | $x^{(0)\prime}$ | $y^{(0)\prime} - \Delta_y$ | $z^{(0)\prime}$ | $\delta^{(0)\prime} - \Delta\delta'$ |
| $v^{(26)}[n]$ | $x^{(0)\prime} - \Delta_x$ | $y^{(0)\prime} - \Delta_y$ | $z^{(0)\prime}$ | $\delta^{(0)\prime} - \Delta\delta'$ |
| $v^{(27)}[n]$ | $x^{(0)\prime}$ | $y^{(0)\prime}$ | $z^{(0)\prime} - \Delta_z$ | $\delta^{(0)\prime} - \Delta\delta'$ |
| $v^{(28)}[n]$ | $x^{(0)\prime} - \Delta_x$ | $y^{(0)\prime}$ | $z^{(0)\prime} - \Delta_z$ | $\delta^{(0)\prime} - \Delta\delta'$ |
| $v^{(29)}[n]$ | $x^{(0)\prime}$ | $y^{(0)\prime} - \Delta_y$ | $z^{(0)\prime} - \Delta_z$ | $\delta^{(0)\prime} - \Delta\delta'$ |
| $v^{(30)}[n]$ | $x^{(0)\prime} - \Delta_x$ | $y^{(0)\prime} - \Delta_y$ | $z^{(0)\prime} - \Delta_z$ | $\delta^{(0)\prime} - \Delta\delta'$ |

It should be noted that additional velocity hypotheses may be generated based on the addition and/or subtraction of multiple delta values in one or more of the x, y and z axes and the clock drift. Further, the delta values in each of the x, y and z axes may be different.

Based on the LOS vector data 120 received from the navigation engine 100, the velocity hypothesis unit 104 determines 206 the mapping function. Using the mapping function, the velocity hypothesis unit 104 transforms 208 each of the plurality of velocity hypotheses onto an LOS vector for each satellite using $f(v^{(i)}[n], \vec{u}_k)$, $i \geq 0$. This produces a plurality of transformed velocity hypotheses 132, each transformed velocity hypothesis comprising a set of Doppler estimates, one for each satellite, and a clock drift. It is noted that the clock drift is unaffected by the transformation and is the same in the velocity hypothesis as it is in the transformed velocity hypothesis.

The velocity hypothesis unit 104 transfers 210 the plurality of velocity hypotheses 130 and the plurality of transformed velocity hypotheses 132 to the hypothesis determiner 102.

Therefore, the hypothesis determiner 102 now comprises the plurality of velocity hypotheses 130 and a plurality of transformed velocity hypotheses, each comprising a set of Doppler estimates and a clock drift for each satellite and each velocity hypothesis. Each Doppler estimate provides an expected Doppler shift for a satellite signal received from the corresponding satellite based on the velocity hypothesis.

A correlation is undertaken 212 between a first signal comprising an expected Doppler shift derived from one of the plurality of transformed velocity hypotheses, $f(v^{(i)}[n])$, $i \geq 0$, and a second signal comprising a true Doppler shift and derived from one of the plurality of satellite signals (in the case of FIG. 1, the prompt code correlation samples). These corresponding first and second signals each relate to the same satellite.

The corresponding first and second signals may be grouped into a plurality of sets relating to a single velocity hypothesis. For example, each set of corresponding first and second signals may comprise:

a plurality of second signals each derived from a different one of the received satellite signals, e.g. the prompt code correlation samples for each satellite, and each comprising a true Doppler shift; and a plurality of first signals each comprising an expected Doppler shift for the same satellite signals and all based on a single velocity hypothesis.

Each correlator outputs a correlation value showing a correlation between the expected Doppler shift and the true Doppler shift. The correlation values may also be grouped into sets of correlation values relating to the sets of first and second signals. In exemplary methods and apparatus, the sets of correlation values may comprise a correlation value for first and second signals for each satellite and all relating to a single velocity hypothesis.

Figure 2:
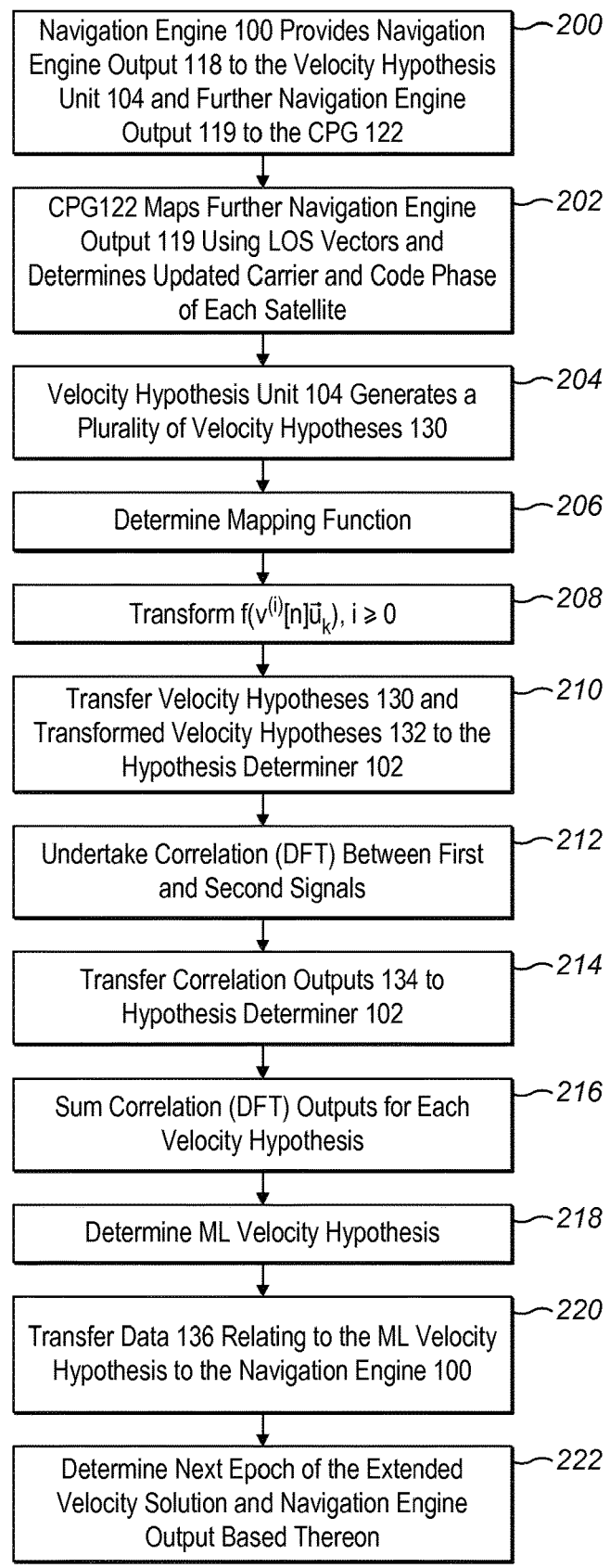
FIG. 2 is a flow diagram showing a method for vector tracking of a plurality of satellite signals received at a GNSS receiver.

In the exemplary method of FIG. 2, the correlation is undertaken by the DFT units 106a-106n, which undertake a DFT on the prompt code correlation samples output by each of the baseband processing units 108a-108n.

The DFT units 106a-106n are configured to undertake a DFT within a range of frequencies covering the expected Doppler shifts for the satellite signal received on that channel of the GNSS receiver. In exemplary arrangements, the DFT units 106a-106n are configured such that the frequency bin spacing is the inverse of the DFT window length, and the spectrum coverage is broad enough to cover all the velocity hypotheses. A DFT is undertaken for each received satellite signal. The DFT units 106a-106n transfer 214 the DFT results 134a-134n to the hypothesis determiner 102.

A DFT can be considered as a plurality of correlations spanning a frequency range. That is, a DFT of a given signal represents a correlation of that signal with a plurality of further signals at equally spaced frequencies (frequency bins) within a range of frequencies. The output of a DFT comprises a frequency value and a magnitude (representing a correlation value), which may be plotted to give a frequency spectrum for the signal. Therefore, provided that the DFT spans a frequency range encompassing the expected Doppler shift relating to a given velocity hypothesis, the magnitude relating to the frequency of the expected Doppler shift represents the correlation value for that velocity hypothesis.

Therefore, each DFT output from a DFT unit 106a-106n comprises a plurality of pairs of magnitudes and frequencies. The correlation values are determined by selecting DFT magnitude values relating to the frequencies of the expected Doppler shifts.

A navigation message is a continuous data stream modulated onto the carrier signal of every satellite before transmission. The modulating bit removal units 110a-110n remove these modulating data bits from the prompt code correlation samples, and pre-integrate the latter over several milliseconds. The pre-integrated samples are buffered before being transferred to the DFT units 106a-106n for further correlation. Removal of the modulating bits allows integration of the prompt code correlation samples over timeframes up to hundreds of milliseconds in 110a-110n depending on the clock stability. This is in contrast to the much smaller (maximum 20 millisecond) integration times typically used in some GNSS receivers. The advantage of the long coherent integration is higher tracking sensitivity and higher frequency resolution in the DFT units 106a-106n since the latter is proportional to the integration length.

The modulating bit removal units 110a-110n receive a copy of the navigation messages 140a-140n. The copy of the navigation message is generated by decoding the satellite signals in the receiver. The modulating bit removal units 110a-110n use that copy of the navigation messages to remove the bit flips in the prompt code correlation samples before further integration. This may be done, for example, by multiplying the prompt code correlation samples by the copy of the navigation message to cancel out the modulating bits. This prevents the destructive superposition in an integration spanning multiple bits of the navigation messages and allows longer integration times. This in turn increases the frequency resolution of the DFTs undertaken by the DFT units 106a-106n. When receiving the modulating bits from the internal navigation message buffer, the modulating bit removal units 110a-110n use the signal time-of-week to determine which modulating bit is applicable for the current prompt code correlation output. If no modulating bit is applicable a coherent integration length of 20 milliseconds instead of hundreds of milliseconds are configured in the DFT units 106a-106n.

The hypothesis determiner 102 is configured to sum 216 the correlation values across all received satellite signals relating to a single velocity hypothesis. That is, the hypothesis determiner 102 is configured to sum the correlation values in a set of correlation values, which all relate to a single velocity hypothesis. The summation is repeated by the hypothesis determiner 102 for each velocity hypothesis. In practice, the hypothesis determiner 102 may undertake the summations using equation (5) above. The hypothesis determiner 102 determines 218 the most likely velocity hypothesis to be the velocity hypothesis that relates to the largest summation.

The hypothesis determiner 102 transfers 220 data relating to the most likely velocity hypothesis 136 to the navigation engine. In the exemplary method of FIG. 2, the hypothesis determiner 102 transfers the actual most likely velocity hypothesis to the navigation engine 100. The navigation engine 100 uses the most likely velocity hypothesis in the new Kalman filter observation vector along with code phase estimates (discussed below) and determines 222 the next epoch of the navigation solution and navigation engine output based on the Kalman filter observation vector and $p^{(0)}[n]$.

In exemplary methods and apparatus, the early, prompt and late code correlation samples may also be transferred to the integrate-and-dump units 112a-112n from the baseband processing units 108a-108n, where integration occurs in the usual way. The integrated early, prompt and late code correlation samples are transferred to the code phase estimation units 114a-114n, which determine the code phase estimates based thereon in the usual way. The code phase estimates 138a-138n are sent to the navigation engine 100 and are added to the observation vector and used by the navigation engine to determine the next epoch of navigation solution and the next navigation engine output to be provided to the velocity hypothesis unit 104 and the CPG 122.

In exemplary methods and apparatus, the hypothesis determiner 102 is configured to determine the most likely velocity hypothesis associated with the greatest summation of the correlation values discussed above in dependence on that summation being greater than a threshold value. The threshold value is determined to ensure that the selected hypothesis is truly the most likely hypothesis and is not simply noise. The hypothesis determiner 102 may comprise a threshold detector, which serves as a lock loss detector when tracking extremely weak signals. Similarly, exemplary methods and apparatus may be used for reacquisition of satellite signals after signal loss, for example on entry into a building, as the last known navigation solution (before signal loss) should be accurate enough to be able to reacquire the satellites.

Figure 3:
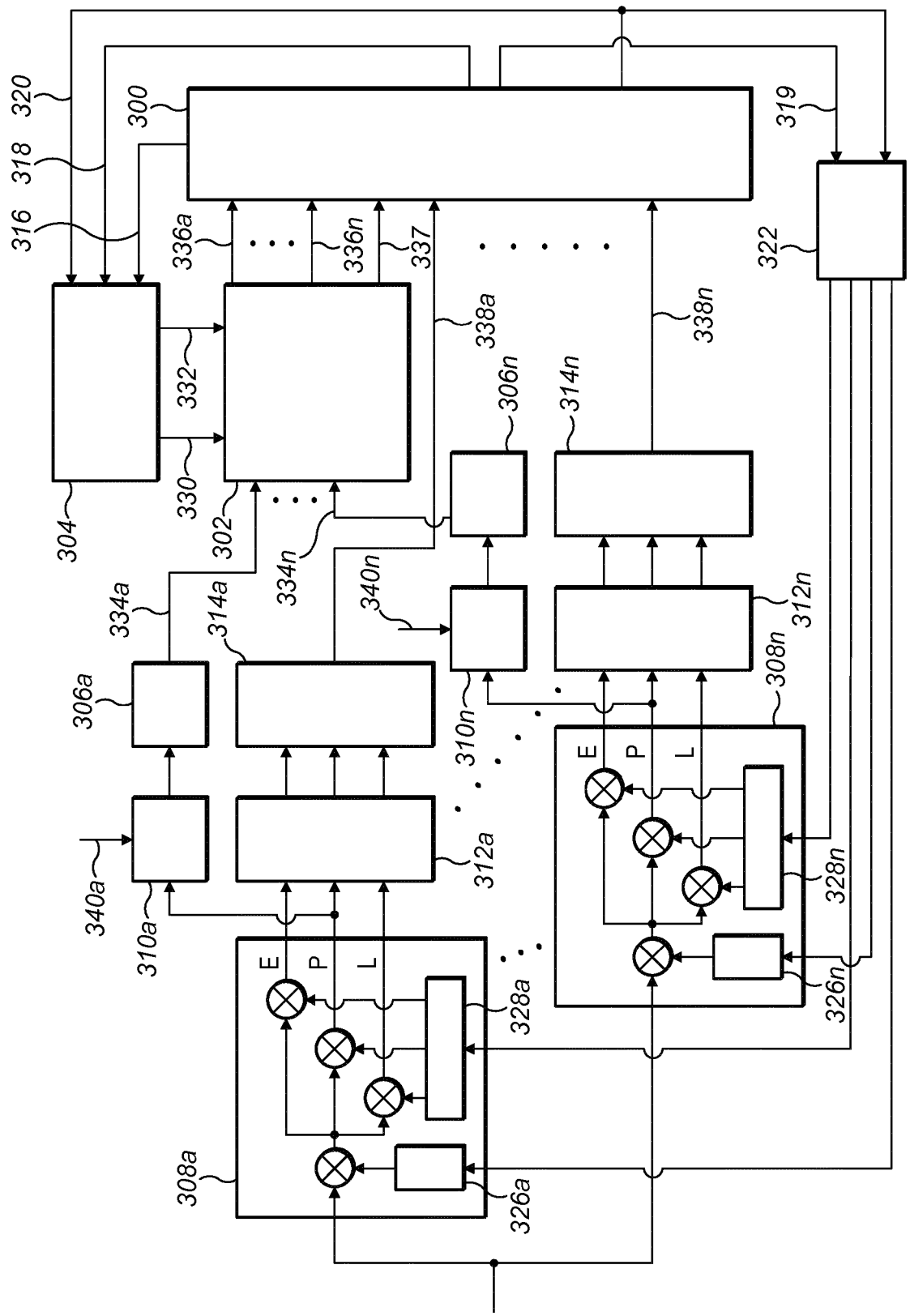
FIG. 3 is a block schematic diagram of an apparatus for vector tracking of a plurality of satellite signals received at a GNSS receiver.

FIG. 3 shows a block schematic diagram of an exemplary apparatus for tracking GNSS satellite signals. Many of the features of FIG. 3 are the same or similar to those already discussed above in relation to FIG. 1. Those features have the same reference numerals as in FIG. 1 except that they begin with a "3" instead of a "1" and are not discussed again except to the extent that they relate to the operation of the apparatus of FIG. 3.

In the exemplary arrangement of FIG. 3, the hypothesis determiner 302 is configured to determine the most likely velocity hypothesis using the method described above in relation to FIGS. 1 and 2. In the case of the apparatus of FIG. 3, the data relating to the most likely velocity hypothesis that is transferred by the hypothesis determiner 302 to the navigation engine 300 comprises Doppler estimates 336a-336n for each satellite and a clock drift estimate 337. The hypothesis determiner 302 determines the most likely velocity hypothesis and then identifies the transformed velocity hypothesis from the plurality of transformed velocity hypotheses that corresponds to that most likely velocity hypothesis. The hypothesis determiner 302 then transfers the corresponding set of Doppler estimates 336a-336n and the clock drift estimate 337 to the navigation engine 300.

The navigation engine 300 is configured to use the Doppler estimates 336a-336n, the clock drift estimate 337 and the code phase estimates 338a-338n in a Kalman filter to provide the next navigation solution.

An advantage of the apparatus of FIG. 3 is that it can be used with a standard Kalman filter running in the navigation engine of known GNSS receivers. No modification of the Kalman filter used in the navigation engine is required because the observation vector includes the Doppler estimates 336a-336n and the code phase estimates 338a-338n. The apparatus of FIG. 3 can therefore be more easily integrated into existing GNSS receivers.

Figure 4:
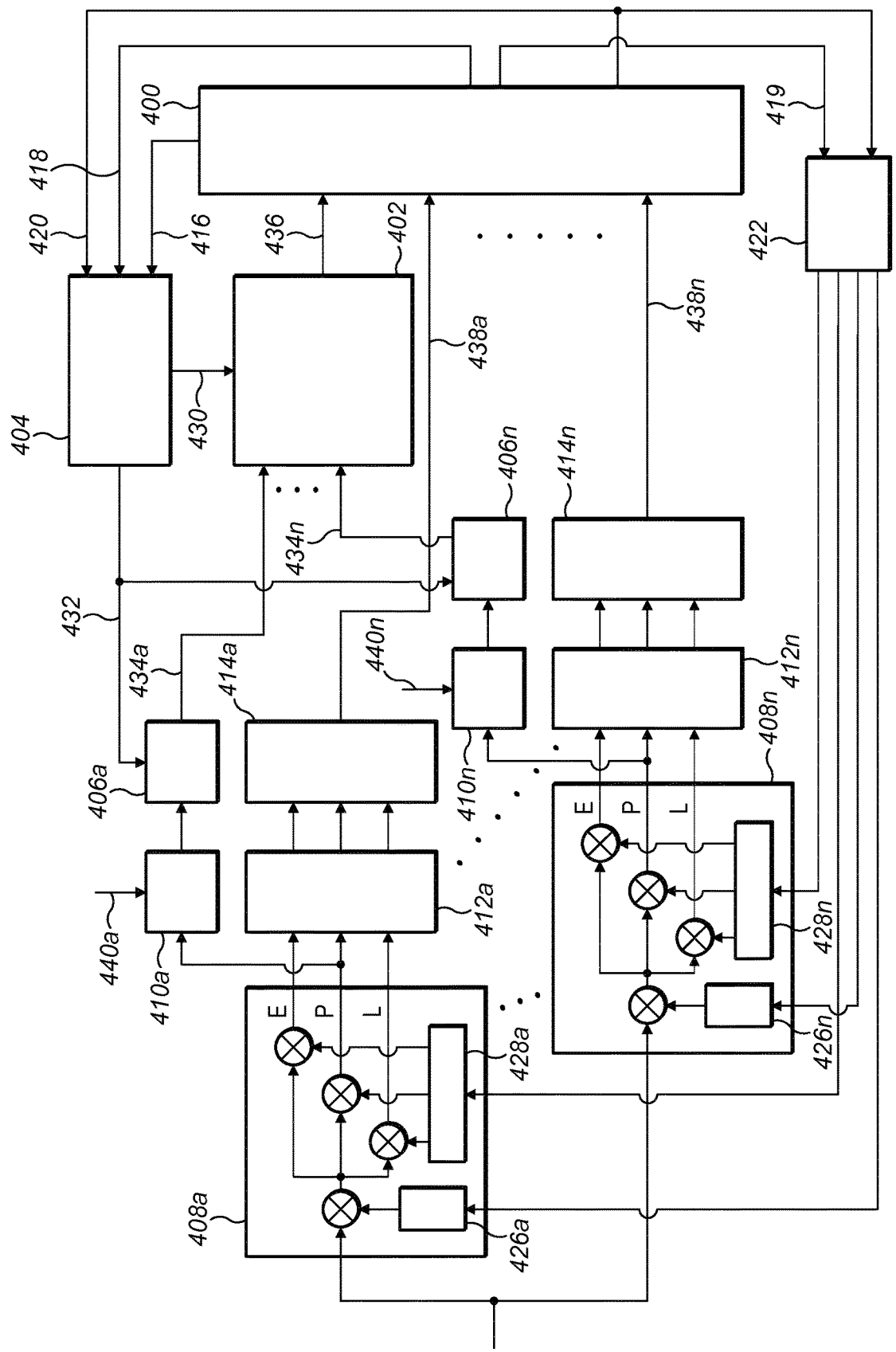
FIG. 4 is a block schematic diagram of an apparatus for vector tracking of a plurality of satellite signals received at a GNSS receiver.

FIG. 4 shows a block schematic diagram of a further exemplary apparatus for tracking GNSS satellite signals. Many of the features of FIG. 4 are the same or similar to those already discussed above in relation to FIGS. 1 and 3. Those features have the same reference numerals as in FIGS. 1 and 3 except that they begin with a "4" instead of a "1" or a "3" and are not discussed again except to the extent that they relate to the operation of the apparatus of FIG. 4.

In FIG. 4, a specific correlator 406a-406n in each channel is used rather than a DFT unit configured to undertake a DFT spanning a frequency range including an expected Doppler shift. The correlator 406a-406n may be embodied in hardware or software. In fact the correlator 406a-406n may be still be configured to undertake a DFT, although that DFT is only computed at a single frequency bin (or a plurality of selected frequency bins) corresponding to the expected Doppler shift(s).

The correlator 406a-406n is configured to receive a first signal 432 from the velocity hypothesis unit 404 comprising an expected Doppler shift and a second signal 442a-442n comprising a true Doppler shift. The correlator 406a-406n in each channel is configured to output 434a-434n a value indicative of the correlation between the first signal and the second signal. As shown in FIG. 4, the first signal 432 may be derived from the transformed velocity hypotheses from the velocity hypothesis unit 404, and be representative of the expected Doppler shifts, each for a given satellite and a given velocity hypothesis. The second signal is derived from the prompt code correlation samples, as explained above.

It should be noted that the correlator 406a-406n may be embodied as a plurality, or bank, of correlators in each channel, for example, one for each velocity hypothesis that are configured to run correlations in parallel. In such arrangements, each correlator in a channel may receive a generated signal representative of an expected Doppler shift for a given velocity hypothesis and a given satellite relevant to the channel. Alternatively, there may be a single correlator 406a-406n in each channel that is configured to undertake sequential correlations, each sequential correlation between the second signal 442a-442n and a generated signal representative of an expected Doppler shift for a different one of the velocity hypotheses.

Therefore, the correlator 406a-406n in each channel is configured to determine a plurality of correlation values 434a-434n, each relating to a different one of the velocity hypotheses.

Each correlator 406a-406n transfers the determined correlation values to the hypothesis determiner 402. The hypothesis determiner 402 is configured to sum the correlation values across all satellites for each velocity hypothesis. The hypothesis determiner 402 is then able to determine the most likely velocity hypothesis and transfer data 436 relating to that most likely hypothesis to the navigation engine 400, as described above. The data relating to the most likely velocity hypothesis may comprise the most likely velocity hypothesis itself and/or the estimated Doppler and estimated clock drift relating to the most likely velocity hypothesis.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An apparatus, comprising:
    a plurality of correlators configured to determine a plurality of correlation values between
        a plurality of first signals each comprising an expected Doppler shift and
        a plurality of second signals each comprising a true Doppler shift,
    wherein:
        the first signals are derived from transformation of a plurality of velocity hypotheses using line-of-sight data for a plurality of satellites, and
        the second signals are derived from prompt code correlation samples for the plurality of satellites; and
    a hypothesis determiner, implemented by at least one processor of the apparatus, configured to:
        determine a most likely velocity hypothesis from the plurality of velocity hypotheses based on the plurality of correlation values, and
        transfer data related to the most likely velocity hypothesis to a navigation engine, implemented by at least one processor of a global navigation satellite system (GNSS) receiver,
    wherein the plurality of velocity hypotheses are generated based on a navigation engine output indicative of at least one of a current extended velocity solution or a previous extended velocity solution for the GNSS receiver.

2. The apparatus according to claim 1, wherein the data related to the most likely velocity hypothesis comprises at least one of:
    the most likely velocity hypothesis, or
    a plurality of expected Doppler shifts associated with the most likely velocity hypothesis, each of the plurality of expected Doppler shifts relating to one of the plurality of satellites.

3. The apparatus according to claim 1, wherein the plurality of velocity hypotheses are generated based on a predicted change in one or more elements of the at least one of the current extended velocity solution or the previous extended velocity solution.

4. The apparatus according to claim 3, wherein the predicted change is determined based on at least one of:
    dynamics of the receiver,
    a variance of navigation data,
    inertial sensor data, or
    map data.

5. The apparatus according to claim 1, wherein:
    corresponding first and second signals each relate to one of the plurality of satellites, and
    the correlation values represent correlations between the corresponding first and second signals.

6. The apparatus according to claim 5, wherein each of a plurality of sets of corresponding first and second signals relates to one of the velocity hypotheses.

7. The apparatus according to claim 6, wherein each of a plurality of sets of the correlation values comprises a correlation value for each corresponding first and second signal in a set of corresponding first and second signals.

8. The apparatus according to claim 7, wherein the hypothesis determiner is configured to determine the most likely velocity hypothesis by:
    determining at least one sum of a plurality of correlation values in a set of correlation values,
    wherein the most likely velocity hypothesis is determined based on the at least one sum.

9. The apparatus according to claim 8, wherein the hypothesis determiner is configured to:
    determine a plurality of sums each relating to a different set of correlation values, and
    determine the most likely velocity hypothesis to be a velocity hypothesis relating to a largest sum among the plurality of sums.

10. The apparatus according to claim 9, wherein the hypothesis determiner is configured to determine the velocity hypothesis relating to the largest sum to be the most likely velocity hypothesis in accordance with the largest sum being greater than a threshold value.

11. The apparatus according to claim 1, wherein at least one of the plurality of correlators is further configured to:
    undertake a discrete Fourier transform (DFT) of a signal derived from one or more of late code correlation samples, prompt code correlation samples, or early code correlation samples,
    wherein:
        the DFT spans a range of frequencies encompassing a frequency of the expected Doppler shift, and
        a corresponding correlation value is indicative of a magnitude of an output of the DFT at the frequency of the expected Doppler shift.

12. The apparatus according to claim 11, further comprising:
    a modulating bit removal unit, implemented by the at least one processor of the apparatus, configured to remove a navigation message from the signal derived from the one or more of the late code correlation samples, the prompt code correlation samples, or the early code correlation samples before the one or more of the plurality of correlators undertake the DFT.

13. The apparatus according to claim 1, further comprising:
one or more code phase estimation units, implemented by the at least one processor of the apparatus, configured to:
receive a signal derived from at least one of late code correlation samples, prompt code correlation samples, or early code correlation samples for one or more of the plurality of satellites;
determine one or more code phase estimates based on the received signal; and
transfer the one or more code phase estimates to the navigation engine.

14. The apparatus according to claim 1, wherein at least one of the plurality of correlators is further configured to:
undertake a discrete Fourier transform (DFT) of a signal derived from the prompt code correlation samples, wherein:
the DFT spans a range of frequencies encompassing a frequency of the expected Doppler shift, and
a corresponding correlation value is indicative of a magnitude of an output of the DFT at the frequency of the expected Doppler shift.

15. The apparatus according to claim 1, further comprising at least one of:
a velocity hypothesis unit, implemented by the at least one processor of the apparatus, configured to generate one or more of the plurality of velocity hypotheses or the first signals; or
the navigation engine.

16. The apparatus according to claim 15, further comprising:
the navigation engine configured to determine a subsequent extended velocity solution based at least in part on the data related to the most likely velocity hypothesis.

17. A method, comprising:
determining a plurality of correlation values between
a plurality of first signals each comprising an expected Doppler shift and
a plurality of second signals each comprising a true Doppler shift,
wherein:
the first signals are derived from transformation of a plurality of velocity hypotheses using line-of-sight data for a plurality of satellites, and
the second signals are derived from prompt code correlation samples for the plurality of satellites;
determining a most likely velocity hypothesis from the plurality of velocity hypotheses based on the plurality of correlation values; and
transferring data related to the most likely velocity hypothesis to a navigation engine,
wherein the plurality of velocity hypotheses are generated based on a navigation engine output indicative of at least one of a current extended velocity solution or a previous extended velocity solution for a global navigation satellite system (GNSS) receiver.

18. The method according to claim 17, wherein the data related to the most likely velocity hypothesis comprises at least one of:
the most likely velocity hypothesis, or
a plurality of expected Doppler shifts associated with the most likely velocity hypothesis, each of the plurality of expected Doppler shifts relating to one of the plurality of satellites.

19. The method according to claim 17, further comprising:
generating the plurality of velocity hypotheses.

20. A non-transitory processor-readable medium storing instructions that are executable by one or more processors of an apparatus to perform a method, the method comprising:
determining a plurality of correlation values between
a plurality of first signals each comprising an expected Doppler shift and
a plurality of second signals each comprising a true Doppler shift,
wherein:
the first signals are derived from transformation of a plurality of velocity hypotheses using line-of-sight data for a plurality of satellites, and
the second signals are derived from prompt code correlation samples for the plurality of satellites;
determining a most likely velocity hypothesis from the plurality of velocity hypotheses based on the plurality of correlation values; and
transferring data related to the most likely velocity hypothesis to a navigation engine for tracking the satellite signals,
wherein the plurality of velocity hypotheses are generated based on a navigation engine output indicative of at least one of a current extended velocity solution or a previous extended velocity solution for a global navigation satellite system (GNSS) receiver.

* * * * *